US007675538B2

United States Patent
Schrader et al.

(10) Patent No.: US 7,675,538 B2
(45) Date of Patent: Mar. 9, 2010

(54) MONITORING AND CONTROL OF ADMINISTRATION SYSTEMS

(75) Inventors: Thies Schrader, Haslum (NO); Tom Ingebrigtsen, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1287 days.

(21) Appl. No.: 11/169,634

(22) Filed: Jun. 30, 2005

(65) Prior Publication Data
US 2006/0012672 A1    Jan. 19, 2006

(30) Foreign Application Priority Data
Jul. 1, 2004   (NO) .................................. 20043094

(51) Int. Cl.
H04N 7/14    (2006.01)
H04Q 11/00    (2006.01)
(52) U.S. Cl. ............... 348/14.08; 348/14.01; 348/14.12
(58) Field of Classification Search ... 348/14.01–14.16; 370/260–261; 379/200, 202.01, 201.01; 455/411, 466, 419
See application file for complete search history.

(56) References Cited

U.S. PATENT DOCUMENTS 5,589,878 A    12/1996    Cortjens
5,996,094 A    11/1999    Ito
7,385,622 B2 *    6/2008    Babka et al. ............. 348/14.09
2003/0039216 A1    2/2003    Sheldon
2003/0078032 A1    4/2003    Pie et al.

FOREIGN PATENT DOCUMENTS

| EP | 0969687 | 1/2000 |
| EP | 1164774 | 12/2001 |
| WO | WO 03039181 | 5/2003 |
| WO | WO 03049439 | 6/2003 |

* cited by examiner

Primary Examiner—Melur Ramakrishnaiah
(74) Attorney, Agent, or Firm—Oblon, Spivak, McClelland, Maier & Neustadt, L.L.P.

(57) ABSTRACT

The present invention allows administrators of conference equipment, remotely localized from the ordinary managing interface, to execute simple commands for solving a problem that may have occurred during a conference or at conference set up. This is provided by a parser translating user terminal commands transmitted from the user terminal (e.g. a cellular phone) of the system administrator to Conference Management System codes, which are executed on the conference equipment in question from the Conference Management System. The present invention also allows system administrators to be alerted by a message (e.g. SMS) at any errors occurring during a conference or conference set up, and to correct the errors by responding to the alert without the need of addressing the equipment in which the errors occur.

8 Claims, 3 Drawing Sheets

MONITORING AND CONTROL OF ADMINISTRATION SYSTEMS

CROSS-REFERENCE TO RELATED APPLICATION

The present application claims priority under 35 U.S.C. § 119 to Norwegian patent application number 20043094, filed in the Norwegian patent office on Jul. 1, 2004.

FIELD OF THE INVENTION

The present invention relates to managing, controlling and scheduling videoconferences.

BACKGROUND OF THE INVENTION

Conventional videoconferencing systems comprise a number of end-points communicating real-time video, audio and/or data streams over and between various networks such as WAN, LAN and circuit switched networks.

A number of videoconference systems residing at different sites may participate in the same conference, most often, through one or more MCU's (Multipoint Control Unit) performing i.a. switching functions to allow the audiovisual terminals to intercommunicate properly.

As videoconferencing involves various recourses and equipment simultaneously interoperating at different localizations and capabilities, there is a need for the possibility to manage the resources involved both for scheduled and ad hoc videoconferences. The wording schedule or scheduler shall also be understood as including setting up ad-hoc meetings or calls.

Unfortunately, configuring, scheduling and establishing a video call is a complex process beyond the expertise of many users of video devices. For instance, manufacturers of video devices typically include unique interfaces accessed through video endpoints that are complex and difficult to use. Even if a user becomes accustomed to a user interface of a given manufacturer, user interfaces of endpoints by different manufacturers are often substantially different so that users typically need to relearn video call configuration and set-up with each user interface. Assuming that a user is able to successfully interact with a video end point user interface, other complexities remain as an obstacle to a successful video call configuration. With multi-endpoint video calls of three end-points or more, the user must typically route the video call through a multi-call unit (MCU). As another layer of complexity, if video devices communicate over different protocols, such as H.323 and H.320, then the user typically must route the video call through a gateway device.

In addition to configuring a video call through different types of video devices made by different manufacturers, users seeking to configure a video call must also typically schedule the video devices so that they are available at the desired time of the video call. Companies typically delegate scheduling functions to technical staff that reserves devices and bandwidth for desired line speed for the video call. As video call technology advances, the scheduling of devices has grown more complex. For instance, video devices may include specially manufactured MCU and gateway devices or may include MCU and gateway devices provided by internet protocol servers with the video calls routed as TCP/IP packets. Thus, a video call between a large number of users may include a variety of specially manufactured video devices and internet-based video devices with an array of bandwidth and latency considerations that may affect video call quality. Further, to obtain optimal quality individual characteristics of video devices typically must be considered.

A variety of errors may occur at start up and during a conference, which may require assistance from technical staff. It is unreasonable to expect expertise to be available at any start up or at any time during a conference. Nevertheless, the lack of qualified technical personnel results in many cancelled meetings, quite simply because the problem seems to be unsolvable for the participants, even though a simple command may have connected or proceeded a cancelled or interrupted conference.

SUMMARY OF THE INVENTION

It is an object of the present invention to provide a method and a system avoiding the above described problems.

The features defined in the independent claims enclosed characterise this method and system. A first aspect of the present invention discloses a method for providing control and scheduling of conference devices connected to a Conference Management System (CMS) having predefined CMS scheduling and control codes, including the steps of receiving a user terminal originated command at least attaching one or more device identifications in a Parser connected to the Conference Management System, making a look up in a first mapping table for said user terminal originated command, if a match between said user terminal originated command and a record in said first mapping table is found, then fetching an CMS scheduling or control code, or a data address pointing at an CMS scheduling or control code, associated with said user terminal originated command from said first mapping table and executing said scheduling or control code on one or more conference device(s) identified by said device identification(s) in the Conference Management System.

A second aspect of the present invention discloses a method for providing control and monitoring of conference devices connected to a Conference Management System (CMS) having predefined CMS alerts and control codes, including the steps of receiving an CMS alert at least attaching a user terminal address and a conference device identification from the Conference Management System in a Parser connected thereto, making a look up in a second mapping table for said CMS alert, if a match between said CMS alert and a record in said second mapping table is found, then fetching an user terminal alert associated with said CMS alert from said second mapping table and transmitting said user terminal alert including said conference device identification to a user terminal identified by said user terminal address. A system implementing the aspects of the present invention is also disclosed.

BRIEF DESCRIPTION OF THE DRAWINGS

In order to make the invention more readily understandable, the discussion that follows will refer to the accompanying drawings.

BEST MODE OF CARRYING OUT THE INVENTION

In the following, the present invention will be discussed by describing a preferred embodiment, and by referring to the accompanying drawings. However, people skilled in the art will realize other applications and modifications within the scope of the invention as defined in the enclosed independent claim.

The present invention takes advantage of the mobility of SMS messaging enabling ad hoc managing and controlling of conference calls. The present invention allows administrators of conference equipment, remotely localized from the ordinary managing interface, to execute simple commands for solving a problem that may have occurred during a conference or at conference set up.

As an example, consider a conference being scheduled by a system administrator on behalf of the board of directors, whose members are located at two different sites. The system administrator has in advanced indicated in a Management System which conference equipment to be used (MCU, endpoints, etc.), and which time the conference automatically should be set up. However, when the meeting is to be started, the participants experience that the endpoints at the respective sites are unable to connect to each other. They are not able to solve the problem by themselves, and the system administrator is not present and has no User Interface to the Management System available where he is. However, he has brought with him a cellular phone.

By means of the present invention, the system administrator will in this case be notified about the problem that has occurred by receiving an SMS on his phone. The SMS includes a diagnosis of the problem. In this case, consider that the SMS discloses that one or more ISDN (BRI) channel(s) into endpoint A is down. This means that the signalling part of the conference may have been carried out, but it has not been possible to establish a media connection due to the missing ISDN connection. The system administrator knows that in most cases, the problem will be solved by booting the endpoint. He types in the command "boot [IP.number]" in an SMS message, and sends the SMS to a service number 9999, which is dedicated for this kind of service on that particular Management System. [IP.number] uniquely identifies endpoint A. As a result, endpoint A is successfully being booted, and the system administrator receives a confirmation in an SMS. Further, he sends a second SMS to the service number including the command "reconnect [IP.number]". The conference is then successfully reconnected, and the meeting for the board of directors may start.

Figure 1:
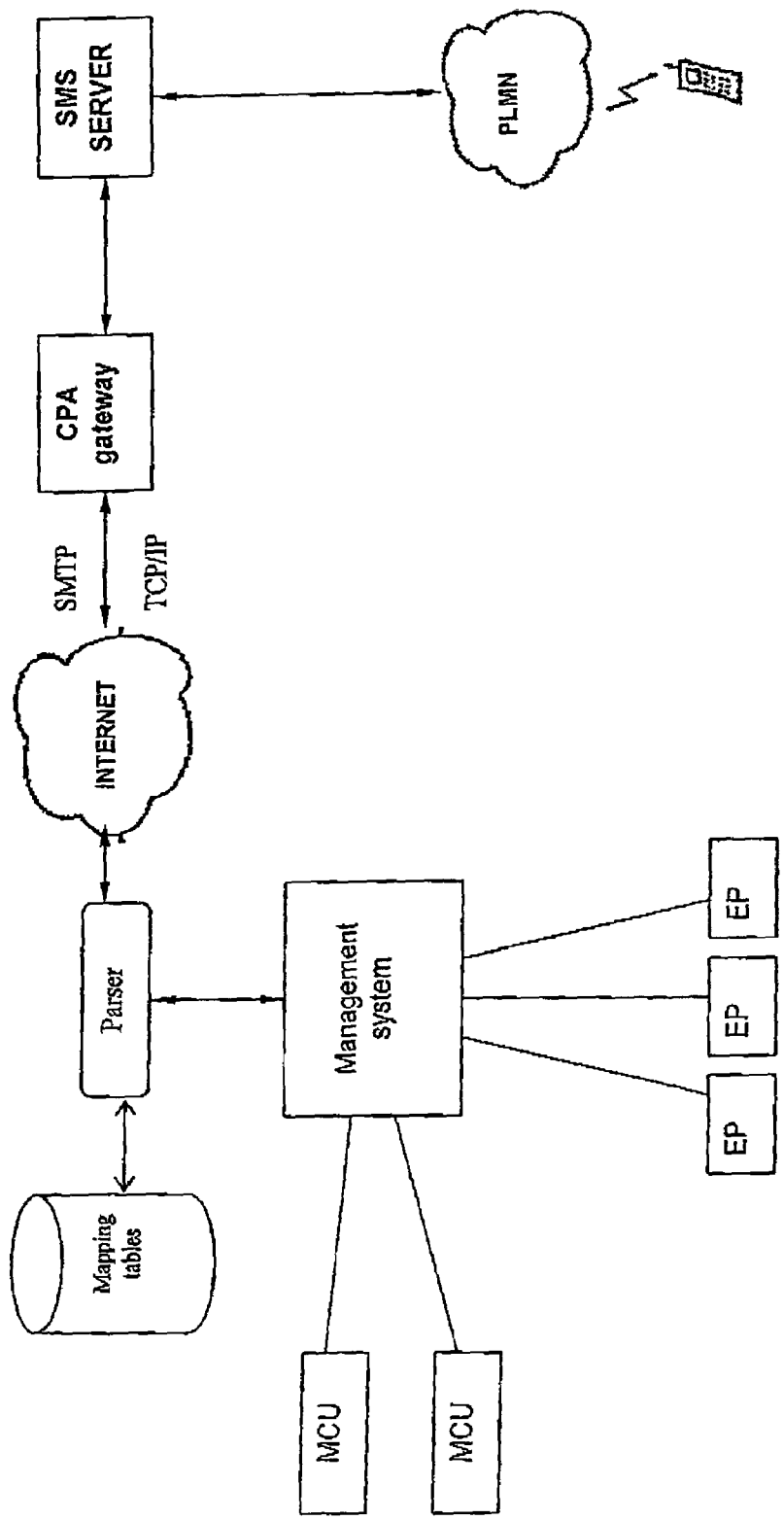
FIG. 1 is a block diagram showing the architecture of one embodiment of the present invention.

FIG. 1 illustrates a system architecture associated with one embodiment of the present invention. The mobile device is connected to a PLMN (Personal Land Mobile Network), which may be a GSM or a UMTS network. For allowing a user to send and receive SMS messages, the PLMN must be in connection with an SMS server, through which SMS messages are relayed. The SMS server is normally located at a mobile network operator and is i.a. responsible for transmitting the SMS messages to the right termination point.

Instead of addressing an SMS message to a termination point in terms of a mobile device, the SMS server is also configured to identify the B number of the SMS message as a service number identifying a service from a certain service provider instead of a subscriber. Such a B number is typically shorter than a subscriber number, starting with a predefined prefix. Once the SMS server has identified the B number as a service number, it routes the message to a so-called CPA (Content Provider Access) gateway. The CPA gateway is i.a. capable of converting the content of the message to a TCP/IP or SMTP format (and vice versa) and then transmitting the content to the service provider. The CPA gateway usually also provide billing information to the mobile operator or the service provider.

The service provider in the context of the present invention would be the management system of the conference equipment in question. As indicated in FIG. 1, the management system includes (or is in connection with) a Parser receiving and transmitting messages from/to the CPA gateway. The main task of the Parser is to translate commands originating from SMS messages to standard code executable for the management system on the conference equipment to which the commands are addressed. The Parser has access to a first mapping table linking all allowed SMS commands to their respective associated Management System executable code. The code describes a routine written in any host language that the management system is able to compile. When the Parser receives an SMS command, it will make a look up in the mapping table. If the received SMS command matches one of the SMS commands listed in the table, the Parser will fetch the associated management system code and transmit it to the Management System together with an address indicating on which device the command is meant to be executed. Alternatively, if the Parser is integrated in the Management System, the first mapping table links the allowed SMS commands to data addresses where the respective code can be found.

The Parser is also configured to translate standard alerts or error messages originating from the Management System to small SMS alerts to be transmitted to a mobile device of e.g. a system administrator. The Parser then uses a second mapping table linking Management System alerts/error messages to their respective associated SMS alerts. When the Parser receives an alert from the Management System, it will make a look up in the mapping table. If the received alert matches one of the alerts listed in the table, the Parser will fetch the associated SMS alert and transmit it to the CPA gateway together with the phone number of the mobile device. Conference management systems normally have the capacity to remotely execute commands on the conference equipment they are managing. In fact, most of the actions that can be carried out on e.g. a videoconference endpoint through its menu system could also be carried out from the management system. Thus, a code with the right syntax could easily be executed, even if it is originating externally.

A Management System usually has a monitor module creating a number of status data and error logs, some of which, according to a preferred embodiment of the present invention, are transmitted to the Parser. Which to be transmitted at what time should be predefined by the system administrator. For example, the system administrator would be interested in being alerted when a certain conference is interrupted or a certain conference set up fails. He should also be allowed to limit the period of alert to e.g. time periods when he is out of office. Alerts received from the Management System in the Parser will be looked up in a second mapping table. If the received alert matches one of the standard alerts listed in the table, the Parser will fetch the associated SMS alert and transmit it to the CPA gateway together with an identification of the device to which the alert is concerned, and the number of the mobile device of the system administrator. The CPA is then able to send the alert by a SMS message via the SMS server to the mobile device of the system administrator, possibly in addition to creating billing information.

Figure 2:
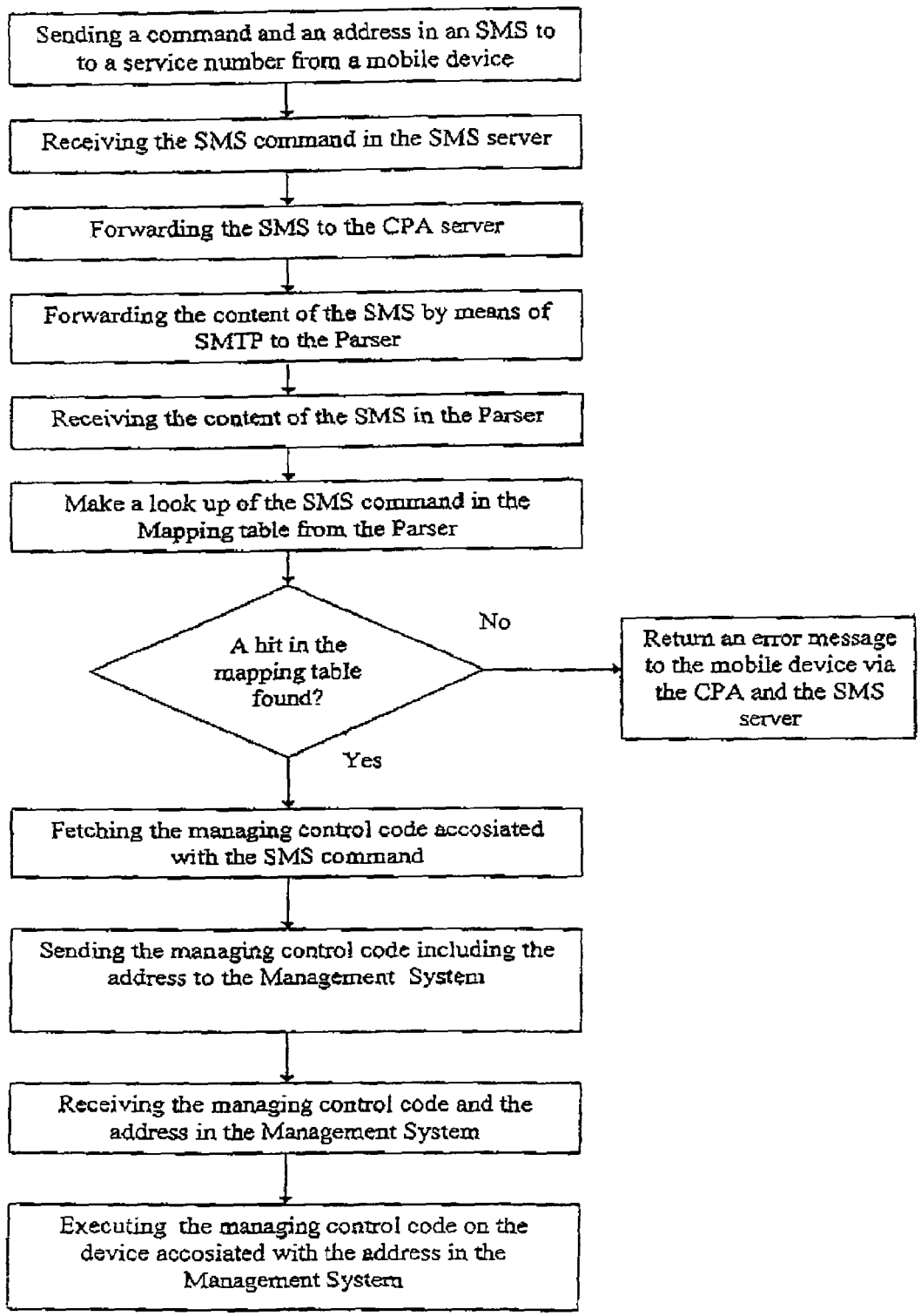
FIG. 2 is a flow chart illustrating the steps of one example of a first aspect of the present invention.

FIG. 2 shows a flow chart illustrating the steps being carried out when the system administrator sends a command via SMS. The SMS includes a predefined command and an IP number addressing the device on which the command should be executed, and the message is sent to a service number identifying the service and the management system. As all other SMS', the message is received by the SMS server connected to the PLMN. The SMS server recognises from the B number that the message is a service request, and thus relaying it to the CPA gateway. The CPA gateway converts the content to an SMTP format and relays it together with originating mobile device's number to the Parser of the addressed Managing System.

When the Parser receives the content of the SMS, it will use the command part of the message to make a look up in one of the available mapping tables. If the command is not found, the Parser returns a standard error message to the mobile device via the CPA and the SMS server. However, if a hit is found, the Parser fetches the associated managing system control code, and transmits the code together with the IP number of the addressed device to the Management System. When the Management System receives the code, it is executed in the normal way as if it was initiated internally. As already indicated if the Parser is integrated in the Management System, instead of fetching and transmitting, the code is executed directly by fetching the data address on which the code is stored from the first mapping table.

Strictly speaking, including the IP number of the addressed device in the SMS message is not necessary if it is a response to a previous alert. As already mentioned, the Management System may include a Monitoring module, which could be configured to send an alert to the Parser when certain events occur. Examples of such situations could be a disconnection, a reduction of available bandwidth during a conference or a hang-up in one of the endpoints or MCUs.

Figure 3:
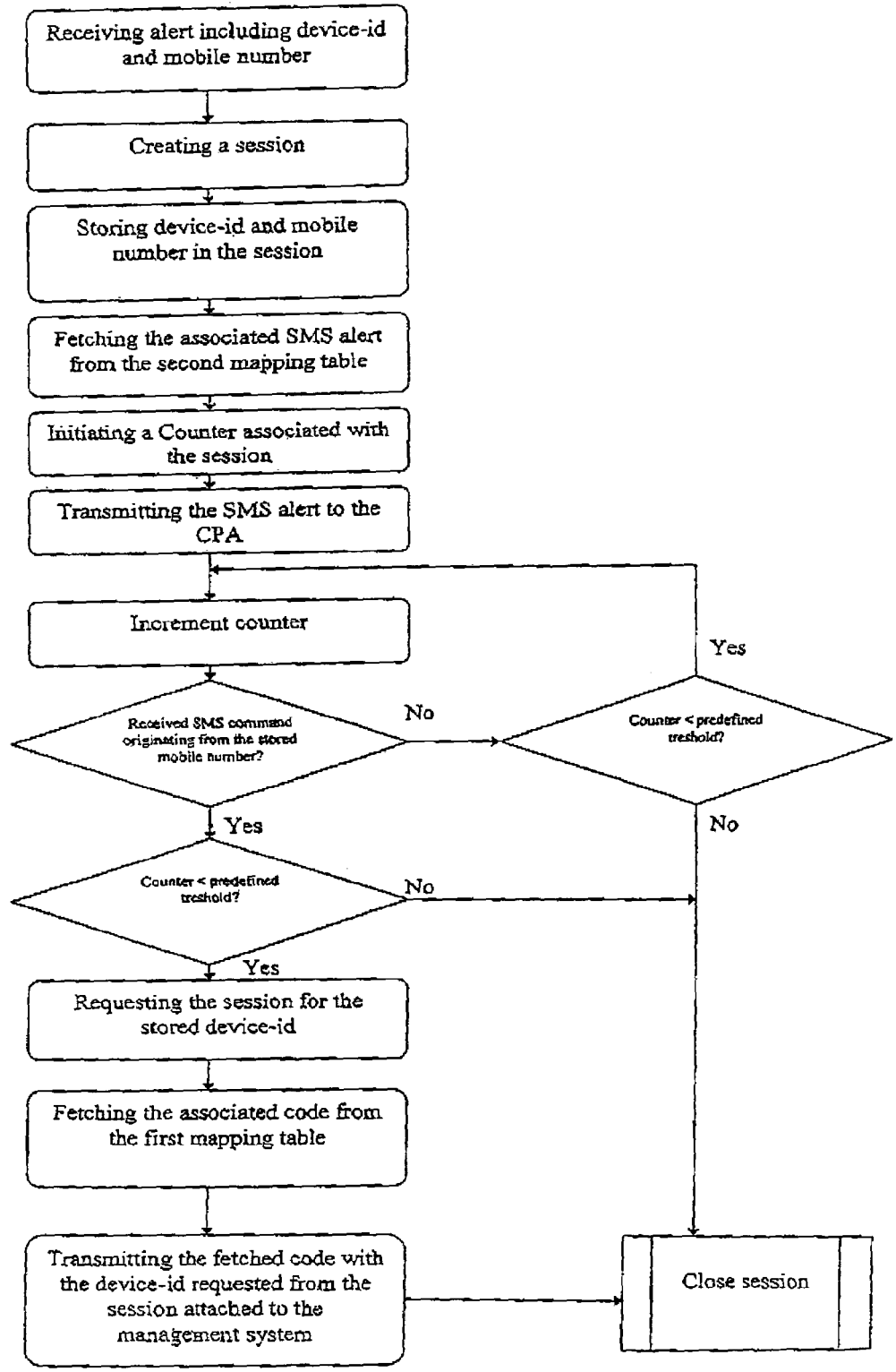
FIG. 3 is a flow chart illustrating the steps of one example of a second aspect of the present invention.

FIG. 3 shows a flow chart illustrating an example of steps being carried out when one such error is monitored by the Management System according to one aspect of the present invention. When receiving the alert, the Parser opens an internal session containing an identification of the device from which the alert originates, and the mobile number of the system administrator that currently is preset to receive the alerts. The Parser then fetches the SMS alert associated with the alert coming from the Management System from the second mapping table linking Management System alerts with the respective SMS alerts. The fetched SMS alert is then transmitted to the CPA gateway, and simultaneously, a counter (alternatively a timer) is started and assigned to the session. The session remains open for a predefined time period represented by the tests against "predefined threshold" in the flow chart.

In this time period, the Parser monitors all incoming messages from the CPA gateway and compares the originating mobile number with the mobile number stored in the session. If the incoming originating mobile number matches the one stored in the session by the elapse of the time period, this is being interpreted as a response to the SMS alert. The Parser then fetches the code associated with the received SMS command from the first mapping table, and transmits it to the Management System together with the device identification stored in the session. However, regardless of if a response is received or not, the session is closed when the time period has elapsed, and all incoming messages received from the CPA gateway is thereafter interpreted as standalone commands requiring an explicit identification of the device on which the command should be executed. Introducing a session in the Parser for each outgoing alert will make it easier for the system manager to respond because it will not be necessary to include an IP number or another address of the device to be operated in the SMS command.

Although the most obvious utilization of the present invention is alerts and control commands to and from a remotely localised system administrator, it could also be used for other management purposes. For example, all conference Management Systems provides scheduling of meetings and conferences. In short, the scheduling module provides booking of resources ahead of a planned conference. In a user interface of the scheduling module, the user selects which localities and conferencing facilities to use in addition to start and end time of the conference. The scheduling module then reserves the indicated facilities at the given time and determines additional resources (MCU's, Gateways etc.) that is necessary to involve for carrying out the conference, and then notifying the participants. The scheduling module may also be configured to automatically initiate the given conference at the start time, and terminate it at the end time.

Now, according to one aspect of the present invention, conferences may also be scheduled by sending SMS commands. A typical SMS scheduling command may be as follows: "Schedule endpoint1 endpoint2 28/08/2004 17:00 18:00". Here, the first word "Schedule" represents the command itself. The next text phrase identifies one or more endpoint to reserve, and the next number format indicates date, start time and end time of the conference, respectively. As for the alert/command situation described above, the SMS is sent to the Parser via the SMS and CPA gateway. The Parser looks up the command "Schedule" in the mapping table, and fetches the corresponding Management System code. This code is transmitted to the Management System together with the identifications of the endpoints and the date, start and end time, in addition to the number of the mobile device that requested the scheduling. This is received by the Management System, and the scheduling can be implemented immediately because the information reaches the system in a known format. The Management System is configured to return a confirmation stating that the scheduling has succeeded. The confirmation is sent in the opposite direction toward the mobile device, looked up in the Parser, captured in an SMS message in the CPA gateway, and finally transmitted to the mobile device from which the scheduling request originated.

In the examples of the aspects of the present invention discussed above, the carrier of the remotely transmitted commands has been SMS messages. However, the scope of the present invention also includes use of other messaging services available from a user terminal. Instead of SMS, the System Administrator could also use Instant Messaging having the Management System or conference devices included in the so-called "buddy list". The commands are then typed into a chat room where the Management System or the addressed conference devices participate, and are sent to a Parser as described above. The SMS server and CPA Gateway in FIG. 1 are then replaced by an Instant Messaging Server. Alternatively, the commands may also be transmitted to the Parser in an e-mail message. An e-mail server will then replace the SMS server and CPA Gateway depicted in FIG. 1.

The invention claimed is:

1. A method for providing control and monitoring of conference devices connected to a Conference Management System (CMS) having predefined CMS alerts and control codes, comprising:
receiving a CMS alert at least attaching a user terminal address and a conference device identification from the Conference Management System in a Parser connected thereto;
creating a Session in said Parser;
storing said user terminal address and conference device identification in the Session;
making a look up in a first mapping table for said CMS alert;
if a match between said CMS alert and a record in said first mapping table is found, then fetching a user terminal alert associated with said CMS alert from said first mapping table, transmitting said user terminal alert including said conference device identification to a user terminal identified by said user terminal address, and if a user terminal originated command originating from a user terminal identified by said user terminal address is received before a predefined time interval started at the time said Session was created is elapsed, then requesting the session for said stored conference device identification, and making a look up in a second mapping table for said user terminal originated command, if a match between said user terminal originated command and a record in said second mapping table is found, then fetching a CMS scheduling or control code, or a data address pointing at a CMS scheduling or control code, associated with said user terminal originated command from said second mapping table, and executing said scheduling or control code on a conference device identified by said device identification in the Conference Management System; and closing said Session in said Parser.

2. The method according to claim 1, wherein if a match between said user terminal originated command and a record in said second mapping table is not found, then returning an error message to a user terminal from which said user terminal originated command originated.

3. The method according to claim 2, wherein if the match between said user terminal originated command and the record in said first mapping table is found, then returning a confirmation message to a user terminal from which said user terminal originated command originated.

4. The method according to claim 3, wherein the conference devices are endpoints, Multi Control Units and/or Gateways.

5. The method according to one of the claims 1, 2, 3, or 4, wherein said user terminal originated command originally is captured in an SMS message and addressed by a service number identifying the Conference Management System.

6. A system for providing control, scheduling and monitoring of conference devices connected to a Conference Management System (CMS) having predefined CMS alerts, scheduling and control commands, comprising:

a storing device including a first mapping table mapping the predefined CMS alerts with associated user terminal alerts and a second mapping table mapping the predefined CMS scheduling and control codes, or data addresses respectively pointing at CMS scheduling or control codes, with associated user terminal commands, a Parser adjusted to make a look up in said first mapping table for one of the predefined CMS alerts and to fetch an associated one of said user terminal alerts, and further adjusted to make a look up in said second mapping table for one of said user terminal commands and to fetch an associated one of the CMS scheduling and control codes, or the respective data addresses, and a communication network adjusted to receive user terminal alerts transmitted from said Parser, and to transmit user terminal commands to said Parser, and wherein the CMS is configured to transmit CMS alerts each attaching a user terminal address and one or more conference device identification(s) to said Parser and to instantaneously execute the CMS scheduling and control codes received or disclosed from the Parser.

7. The system according to claim 6, wherein the Parser is configured to create a Session when receiving an CMS alert and storing a user terminal address and conference device identification attached to said CMS alert in the Session, and further to interpret a user terminal command, originating from a user terminal identified by said stored user terminal address, received within a time interval started when said Session was crated, as a response to said CMS alert, and then addressing an CMS control code associated with said user terminal command with said stored conference device identification.

8. The system according to claim 6 or 7, wherein said communication network is a GSM or UMTS network, said user terminal commands transmitted from said network are provided to said Parser from a CPA (Content Provider Access) gateway originating from SMS messages transmitted to said CPA from an SMS server associated with said GSM or UMTS network, and said CPA is further configured to provide said user terminal alerts transmitted from the Parser to said GSM or UMTS network via said SMS server.

* * * * *